United States Patent Office 3,190,924
Patented June 22, 1965

---

3,190,924
PROCESS FOR THE PRODUCTION OF ORGANIC DIHYDROPEROXIDES
Heinrich Sodomann, Bruno Hauschulz, and Meinloh Hanke, all of Gladbeck, Westphalia, Germany, assignors to Phenolchemie G.m.b.H., Gladbeck, Westphalia, Germany, a German corporation
No Drawing. Filed May 5, 1961, Ser. No. 108,194
Claims priority, application Germany, May 6, 1960,
P 24,963
8 Claims. (Cl. 260—610)

The present invention relates to the production of organic dihydroperoxides and more particularly to an improvement in the process for recovering the corresponding dihydroperoxide content in high purity from the organic reaction mixture resulting from the oxidation of dialkylated aromatic hydrocarbons in a particularly efficient manner. More specifically, the present invention concerns the further work-up of the organic reaction mixture after the main portion of the corresponding dihydroperoxide has been recovered therefrom, so that any remaining dihydroperoxide may be recovered as well and said mixture may be recycled to the oxidation reaction zone for further oxidation treatment without significant loss of already formed dihydroperoxide.

It is well known to subject dialkylated aromatic hydrocarbons, such as dialkylbenzenes including diisopropylbenzenes, etc. to oxidation with air or oxygen at increased temperatures in order to form the corresponding monohydroperoxides and dihydroperoxides such as diisopropylbenzene monohydroperoxide, and diisopropylbenzene dihydroperoxide. In addition to these substances, various oxidation by-products are formed which include inter-alia monocarbinols, and dicarbinols, styrenes, etc. Where it is sought to produce primarily dihydroperoxides, conventionally the entire organic oxidation reaction mixture is subjected to an extraction step with dilute alkali solution such as a sodium hydroxide solution, having a concentration of about 1–12% by weight. By means of the aqueous alkali extraction step, the corresponding dihydroperoxides are taken up in the resulting aqueous alkali phase.

Nevertheless, simultaneously, a considerable portion of the oxidation by-products also are taken up into the aqueous alkali phase. In order to further process these dihydroperoxides whereby to form dihydroxy benzenes, for example, in the well known manner, a substantially pure dihydroperoxide starting material is necessary. Therefore, the oxidation by-products which are taken up into the aqueous alkali phase must be washed out of this phase prior to the subsequent treatment of the dihydroperoxides to form the further desired products. This may be effectively carried out by subjecting the aqueous alkali phase to an extraction treatment with organic solvents, preferably the hydrocarbon which is to be oxidized, e.g., m-diisopropylbenzene, which take up the corresponding monohydroperoxide content and the other oxidation by-products. The organic solvent may be conveniently recycled back to the oxidation reaction for further treatment.

Where such oxidation by-products are recycled back to the oxidation reaction as noted above, there occurs a constant enrichment of these by-products within the oxidation reaction mixture which exert an increasingly disturbing influence upon the further oxidation process. In order to prevent such excessive concentration of these by-products in the oxidation reaction chamber, such by-products must be removed therefrom especially where the oxidation process is continuous. This may be carried out by tapping off a portion of the oxidation reaction mixture continuously or intermittently from the reaction chamber for removal of such by-products.

However, in co-pending U.S. application Serial No. 41,704, filed July 8, 1960, a process is disclosed for the production of organic dihydroperoxides in which the continuous recovery of the corresponding dihydroperoxide content in high purity from the organic reaction mixture resulting from the oxidation is carried out. In such process, the oxidation reaction mixture remaining after said recovery of the corresponding dihydroperoxide content is subjected to suitable extraction and hydrogenation steps whereby the separated by-products may be returned to the oxidation in a form more suitable for further treatment, obviating the necessity for tapping off a portion of the oxidation reaction mixture continuously or intermittently from the oxidation reaction zone in order to remove such by-products.

Specifically, in accordance with said co-pending U.S. application, the oxidation reaction mixture obtained from the oxidation of dialkylated aromatic hydrocarbons in the conventional manner is treated with aqueous alkali to extract the corresponding dihydroperoxide content. The resulting aqueous alkali phase containing the dihydroperoxide as well as some monohydroperoxide and other oxidation by-products is thereafter treated with an organic solvent, such as a water immiscible selective organic extraction agent, so as to extract attendant impurities from the aqueous phase, including the corresponding monohydroperoxide content and other oxidation products present in said aqueous alkali phase. The aqueous alkali phase containing the dihydroperoxide content in high purity may thereafter be conveniently further processed in the conventional manner. On the other hand, the monohydroperoxide content and other oxidation products, including monocarbinols, dicarbinols, styrene, etc. which are taken up by the organic solvent, are subjected to a single or multiple stage hydrogenation in order to place the same in a form more suitable for further oxidation. Thereafter, the so-hydrogenated products obtained are recycled back to the oxidation reaction. Essentially, the various by-products concentrated in the organic-solvent phase are reconverted into the dialkylated aromatic hydrocarbon used as starting material in the oxidation, so that upon recycling to the oxidation, otherwise disturbing by-product reactions are avoided. The over-all procedure of said co-pending U.S. application, therefore, permits the efficient production of substantially pure dihydroperoxides which may be desired in a further process for conventionally producing dihydroxy benzene, i.e., resorcinol.

Nevertheless, the organic-solvent phase which is to be subjected to hydrogenation and then recycled to the oxidation objectionably also conains significant quantities of the corresponding dihydroperoxide, since understandably the organic solvent unavoidably takes up such quantities of dihydroperoxide along with the desired by-products. In this connection, it will be recognized that the aqueous alkali phase, prior to organic solvent extraction, contains about 15–18% by weight of dihydroperoxides, for example, as opposed to only about 2–4% by weight or slightly more of the by-products, particularly peroxycarbinol. Upon extraction, the organic solvent phase takes up practically completely the content of by-products present in the aqueous alkali phase, and additionally certain quantities of dihydroperoxide. The particular quantities of dihydroperoxide so taken up by the organic solvent phase, of course, depend upon the type of solvent used in each case.

For instance, where m-diisopropylbenzene is used as organic solvent for the extraction, the same possibly also being used as starting material in the oxidation reaction, the quantity of dihydroperoxide taken up by the organic solvent is still comparatively slight, amounting perhaps to about 0.02% by weight. On the other hand, there are other organic solvents which are better suited for the extraction of the by-products from the aqueous alkali phase because of their greater distribution coefficient characteristics. Among such other solvents are benzene, toluene, xylene, etc. Such other solvents, however, during extraction of the aqueous alkali phase take up considerable quantities of dihydroperoxide, even 1.5% to 2% by weight, besides the by-products. In view of this objectionable feature, a process has been sought whereby such other solvents may still be employed yet without the foregoing disadvantages, since such other solvents offer greater advantages in effecting the extraction procedure, often requiring fewer extraction steps and therefore less expensive apparatus arrangements. As an overall condition, any such process must avoid the taking up of significant quantities of dihydroperoxide by the organic solvent phase, not only because an increased hydrogen consumption will take place undesirably in the hydrogenation step or steps, but also because the final yield of dihydroperoxide available for subsequent work-up, for instance cleavage to form resorcinol, undesirably, will be significantly diminished.

It is an object of the present invention to overcome the foregoing drawbacks and to provide a process whereby the reaction mixture-containing organic solvent phase remaining after extraction with the aqueous alkali phase is further extracted in another step with aqueous alkali to remove substantially all the remaining corresponding dihydroperoxide therefrom, prior to the hydrogenation of said organic solvent phase and the recycling of the hydrogenated products obtained back to the main oxidation.

Other and further objects of the invention will become apparent from a study of the within specification and accompanying example.

It has been found, in accordance with the present invention, that where a continuous oxidation of dialkylated aromatic hydrocarbons is carried out so as to produce a reaction mixture containing the corresponding dihydroperoxides, monohydroperoxides, and other oxidation reaction products, where such oxidation reaction mixture is extracted with aqueous alkali thereafter, in order to recover therefrom the main content of the corresponding dihydroperoxide in the resulting aqueous alkali phase, and where such aqueous alkali phase is further extracted with an organic solvent to remove the corresponding monohydroperoxide content and other oxidation reaction products, so that said dihydroperoxide may be recovered in the aqueous alkali phase in high purity, an improvement in the recovery of the dihydroperoxide content may be achieved. Specifically, the organic solvent phase, containing the corresponding monohydroperoxide content and other oxidation reaction products, which remain after extraction with the aqueous alkali phase, is further treated with aqueous alkali in order to extract substantially all the remaining corresponding dihydroperoxide from the organic solvent phase prior to hydrogenation of said organic solvent phase. Thereafter, the organic solvent phase may be passed to a hydrogenation zone for hydrogenating the monohydroperoxide content and other oxidation reaction products, so that the hydrogenated products may be recycled back into the oxidation reaction zone.

Thus, in accordance with the invention, substantially all of the dihydroperoxide contained in the organic solvent phase, resulting from the extraction of the dihydroperoxide-containing aqueous alkali solution, may be easily recovered by further extracting the organic solvent phase with aqueous alkali prior to the hydrogenation step.

For this further extraction of the organic solvent phase, the same aqueous alkali solutions may be employed as those employed for treating the oxidation reaction mixture for initially removing the main content of dihydroperoxide. In this connection, it is particularly advantageous to employ an aqueous alkali solution, such as a 1 to 20% by weight sodium hydroxide solution. Of course, the aqueous alkali solution may be charged in the form of fresh solution, or the same may be charged in the form of the aqueous alkali phase remaining after the initial extraction of the oxidation reaction mixture in order to obtain the corresponding dihydroperoxide content therein.

By means of the third extraction step, in accordance with the invention, it is possible to recover substantially all of the dihydroperoxide contained in the organic solvent phase, while the by-products, particularly peroxycarbinol, will remain in the organic solvent phase. Accordingly, only traces of dihydroperoxide will remain in the organic solvent phase which is passed to the hydrogenation step. The successful recovery of the remaining corresponding dihydroperoxide by further aqueous alkali treatment of the organic solvent phase is quite surprising, since it would have been assumed that the content of by-products also present in the organic solvent extract phase would likewise again pass into the aqueous alkali phase. However, while the corresponding dihydroperoxide does effectively pass from the organic solvent phase into the aqueous alkali phase at this point, such by-products do not significantly pass over into the aqueous alkali phase. In fact, while about 85–95% by weight of the corresponding dihydroperoxide present in the organic solvent phase is recovered by passing into the aqueous alkali phase, less than about 5% by weight of the by-products pass over into the aqueous alkali phase.

Briefly, in carrying out the particular process in accordance with the improvement of the invention, the aqueous alkali phase containing the crude dihydroperoxide, as a result of the extraction of the raw oxidation reaction mixture, is extracted with the organic solvent phase in order to remove the objectionable by-products which have passed into the aqueous alkali phase from the raw oxidation reaction mixture. While the greatest portion of the by-products is effectively passed into the organic solvent phase in the second extraction step, a certain quantity of dihydroperoxide undesirably also passes into the organic solvent phase. By further extracting the organic solvent phase, for example, with a 1 to 20% by weight sodium hydroxide solution in counter-current, the desired recovery of further dihydroperoxide is effected, whereby the same will not be lost in the subsequent hydrogenation step. The quantity of aqueous alkali is optional, so long as the same is effective for removing the dihydroperoxide present in the organic solvent phase. Appropriately, the aqueous alkali is used in such quantities that after the extraction of the organic solvent phase, the aqueous alkali is, for the most part, saturated with the corresponding dihydroperoxide. For example, it is preferred to choose such quantities that the aqueous alkali phase after the extraction contains about 15–18% by weight of the dihydroperoxide. It will be appreciated that the dihydroperoxide solution obtained in this manner, which contains only very minor quantities of by-products, may be directly further processed in the well known manner.

Generally, the dialkylated aromatic hydrocarbons which are contemplated by the present invention, and which are subjected to oxidation in the conventional manner, include compounds of the general formula

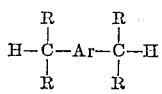

wherein R is alkyl, such as methyl, ethyl, etc. and Ar is an aromatic radical, such as phenyl. Among these starting materials are dialkylated benzene, including diisopropyl benzene, etc. Hydrocarbons which correspond to the aforementioned formula are, for example m-, o-, and p-diisopropyl benzene, m-, o-, p-di-sec.-butylbenzene, p,p'-diisopropyldiphenyl, 1,2-; 1,3-; 1,4- and 1,8-diisopropylnaphthalene and the corresponding sec-butyl compounds, etc.

It will be appreciated that upon treating the aqueous alkali phase with the organic solvent to remove the corresponding monohydroperoxides and other oxidation by-products, and the further treating of the organic solvent phase remaining, with additional aqueous alkali in accordance with the improvement of the invention, the organic solvent may be subjected to a single step or multiple step hydrogenation prior to the return of these products to the oxidation step. The various by-products which are concentrated in the organic phase at this point are conveniently reconverted for the most part into the corresponding dialkylated aromatic hydrocarbon compounds used as starting materials in the oxidation. Accordingly, these products may be again converted by the oxidation step into the desired hydroperoxides.

The aqueous alkali which is used initially to extract the oxidation reaction mixture is conveniently known and may have a concentration of from 1 to 12% by weight. Particularly, a dilute sodium hydroxide solution is most commonly used. The initial organic solvent treatment of the aqueous alkali phase is generally carried out at a temperature of from about 0–80 degrees C.

With respect to the organic solvent used, the same should be substantially immiscible with water. Among the solvents which may be used in this regard are alkyl-substituted- and unsubstituted-aromatic hydrocarbons, ketones, halogenated hydrocarbons, ethers, alcohols, as well as dialkylated aromatic hydrocarbons, such as the starting materials used in the oxidation step. Thus, among these organic solvents or water immiscible selective organic extraction agents for monohydroperoxides and other oxidation by-products are included, preferably, benzene, toluene, and xylene, as well as methyl-ethyl ketone, methyl-propyl ketone, methyl-isopropyl ketone, and methyl-butyl-ketone, etc.; carbon tetrachloride, etc.; diethylether, diisopropyl ether, etc.; butanol, pentanols, etc.

By the organic extraction removal of the undesired by-products from the aqueous alkali phase, and the subsequent recovery of the quantities of dihydroperoxide taken up by the organic solvent extraction by further aqueous alkali treatment, the dihydroperoxide content of both of the aqueous alkali phases in high purity may be further processed, for example, to dihydroxy benzenes, without the attendant difficulties heretofore encountered. Thus, where the presence of such by-products heretofore adversely affected the yield of dihydroxy benzenes in the condensation reaction of dihydroperoxides, in accordance with the improvement of the invention, dihydroperoxides in high purity are recovered which may be condensed to form dihydroxy benzenes of high quality and high yield. More importantly, the quantities of dihydroperoxide, otherwise lost in the organic solvent, are effectively recovered so as to increase the over-all yield of dihydroperoxide produced by the main oxidation reaction.

Specifically, in accordance with the present invention, the production of the corresponding dihydroperoxides, for example by oxidation with air or oxygen of a dialkylated aromatic hydrocarbon compound, such as m-diisopropyl benzene in the conventional manner, is conveniently carried out such that the oxidation reaction product is conducted from the oxidation chamber via a line to a first-aqueous alkali-extractor chamber. The main dihydroperoxide content is extracted therein, for example, by co-current or counter-current technique, by means of an aqueous alkali hydroxide solution, such as for example sodium hydroxide of from 1–12% concentration. The resulting substantially dihydroperoxide-free organic phase is returned to the oxidation chamber for further oxidation treatment while the aqueous alkali phase containing practically all of the dihydroperoxide and the undesired monohydroperoxides and other oxidation by-products is passed to a second-organic solvent-extractor chamber. In this second extraction chamber, the aqueous alkali phase is treated, for example, by co-current or counter-current technique, with an organic solvent, such as the corresponding dialkylated aromatic hydrocarbon used as starting material in the oxidation, i.e., m-diisopropyl benzene, in order to remove the undesired monohydroperoxide and other oxidation by-products. The resulting organic phase obtained at this point, which includes the corresponding monohydroperoxide, mono-oxyhydroperoxide and dicarbinols, as well as significant quantities of the corresponding dihydroperoxide, taken up by the organic solvent, is passed from the second extractor chamber to a third-aqueous alkali-extractor chamber (although this represents a second extraction step using aqueous alkali). In this third extractor chamber, the remaining quantities of the dihydroperoxide are extracted, for example by counter-current or co-current technique using an aqueous alkali hydroxide solution, such as sodium hydroxide of from 1 to 20% concentration. The dihydroperoxide recovered from the organic solvent phase by the aqueous alkali in this manner is advantageously in pure form and substantially free from the corresponding monohydroperoxide and other oxidation by-products. Such aqueous alkali extract, if desired, may be combined with the aqueous alkali extract containing the main part of the dihydroperoxide obtained in the first extraction step, for further work-up. On the other hand, the resulting organic solvent phase is free from all but traces of the corresponding dihydroperoxide and contains the corresponding monohydroperoxides and other oxidation by-products. This organic solvent phase may now be passed conveniently to a conventional hydrogenation reactor. This hydrogenation reactor may be a single stage or multiple stage hydrogenation reactor. In either case, the desired hydrogenation of the monohydroperoxides and other oxidation by-products is efficiently carried out therein, preferably to such a point that the corresponding dialkylated aromatic hydrocarbons used as starting materials in the oxidation are again formed, i.e., m-diisopropyl benzene.

While the hydrogenated product may be recycled to the main oxidation reaction chamber for further oxidation, it will be appreciated that a portion thereof may be recycled to the second-organic solvent-extractor chamber for extraction of the crude dihydroperoxide-containing aqueous alkali phase leaving the first-aqueous alkali-extractor chamber.

For the hydrogenation, conventional hydrogenation conditions may prevail, for example, wherein a temperature of about 140 degrees C. and a pressure of about 15 atmospheres excess pressure are employed. Generally, the temperature range for the hydrogenation is between 50 and 350 degrees C., and the pressure range is between normal pressure and 300 atmospheres. Preferably, a suitable hydrogenation catalyst is used, such as finely divided nickel disposed on a carrier material. In this connection, where a two-stage hydrogenation is employed, the first-stage hydrogenation may be carried out using palladium on an aluminum oxide carrier at a temperature of about 80 degrees C. and a pressure of about 5 atmospheres excess pressure. The product formed in this way may then be hydrogenated in a second-stage hydrogenation using tungsten sulfide at a temperature of about 290 degrees C. and a pressure of about 110 atmospheres excess pressure. The hydrogenation over such fixed-bed catalysts is preferably carried out in a trickling process. The duration of the reaction should not exceed about 15 minutes but should be at least about 1 minute. The throughput per liter of catalyst volume is preferably within the range of 0.5 to 20 kg. per hour of the substance to be hydrogenated.

The hydrogenated products formed in the foregoing manner contain only a very small amount of by-products at this point and may be safely returned to the oxidation chamber for further oxidation treatment. The aqueous alkali phases may be recovered from the second and third extractor chambers containing almost completely pure dihydroperoxide. The dihydroperoxide, therefore, may be further processed, for instance, to dihydroxy benzenes in the conventional manner free from the disturbing influences heretofore encountered as a result of the presence of the oxidation by-products mentioned above.

It will be appreciated that the first extraction of the aqueous alkali phase with organic solvent or water immiscible selective organic extraction agent to remove the undesired monohydroperoxide and other oxidation by-products and the further extraction of the resulting organic solvent phase with additional aqueous alkali may be carried out within a wide temperature range. The lower limit of this range is generally determined by the solidification temperature of the aqueous alkali hydroxide solution while the upper limit is determined by the boiling point of the particular organic solvent or aqueous alkali hydroxide solution employed. For the most part, this range is between 0 and 80 degrees C.

The following example is set forth for the purpose of illustrating the present invention, and it will be understood that the invention is not to be limited thereby.

*Example*

Conventional oxidation of m-diisopropyl benzene is carried out in order to form the corresponding dihydroperoxide and the resulting oxidation reaction mixture is extracted with soda lye (sodium hydroxide solution) having a concentration of 8% by weight. The procedure followed in this respect is disclosed in greater detail in German Patent No. 961,708. The aqueous alkali phase which results contains, in addition to the corresponding dihydroperoxide content, monohydroperoxides, mono-oxyhydroperoxides, and dicarbinols as undesired impurities. In order to remove these impurities, the aqueous alkali phase is extracted in counter-current manner by means of benzene.

Specifically, 10 kg. of a soda lye (sodium hydroxide solution), containing about 1.5 kg. of m-diisopropyl benzene-dihydroperoxide and 200 grams of by-products, were extracted at 20 degrees C. in a 5-step series-extractor with benzene in counter-current flow. The by-products mainly consisted of m-diisopropylperoxycarbinol, and m-diisopropyldicarbinol. About 10 kg. of benzene were used for the extraction. After the extraction, the benzene phase had taken up 186 grams of by-products, i.e., 93% of the charge. The benzene solution also contained 117 grams or about 7.8% of the dihydroperoxide initially present in the aqueous alkali solution. The benzene phase, after the initial extraction with the aqueous alkali, is then further extracted in a subsequent extraction step with a 10% by weight soda lye (sodium hydroxide solution) in a 5-step series extractor in counter-current flow. For this second extraction step, 650 grams of the 10% solution were employed. In the effluent alkali hydroxide solution, 108 grams of dihydroperoxide were found which correspond to 92% of the dihydroperoxide which was present in the benzene solution. By this second aqueous alkali extraction of the benzene solution, only 9.5 grams of the by-products, for the most part, m-diisopropyl peroxycarbinol, pass into the aqueous alkali phase. The benzene solution containing the major portion of the by-products and only trace amounts of the corresponding dihydroperoxide, may then be passed to the hydrogenation step which may be carried out in the known manner.

Thus, the products obtained may be hydrogenated in an autoclave with stirring using a nickel catalyst on silicon dioxide at a pressure of 15 atmospheres excess pressure and a working temperature of 110 degrees C. The reaction is maintained until the absorption of hydrogen is no longer noted. The resulting hydrogenated product is free from hydroperoxide and only contains a small portion of carbinol groups amounting to, for instance, about 0.04% calculated as m-diisopropylbenzene-monocarbinol. The remainder of the hydrogenated product consisted of m-diisopropyl benzene and benzene.

What is claimed is:

1. Process for the continuous recovery of the corresponding dihydroperoxide content in high purity from the organic reaction mixture resulting from the oxidation of dialkylated aromatic hydrocarbons which includes the corresponding monohydroperoxide and other oxidation products in addition to said dihydroperoxide, which comprises treating such reaction mixture with aqueous alkali in a first alkali extraction step to extract said dihydroperoxide, treating the resulting aqueous alkali phase containing said dihydroperoxide with an organic solvent substantially immiscible with water to extract attendant impurities including the corresponding monohydroperoxide and other oxidation products present in said aqueous alkali phase, recovering said aqueous alkali phase containing in high purity the main content of said dihydroperoxide, further treating the remaining organic solvent phase, containing extracted impurities including the corresponding monohydroperoxide and other oxidation products as well as significant quantities of the corresponding dihydroperoxide taken up from the aqueous alkali phase upon extraction with said organic solvent, by further extracting in a second, separate alkali extraction step with aqueous alkali to extract substantially all the remaining corresponding dihydroperoxide from the organic solvent phase prior to hydrogenation of said organic solvent phase, thereafter passing said organic solvent phase to a hydrogenation zone and hydrogenating said monohydroperoxide and other oxidation products and recycling the hydrogenated products obtained back to the oxidation.

2. Process according to claim 1 wherein the dialkylated aromatic hydrocarbon is diisopropylbenzene and the aqueous alkali is dilute sodium hydroxide solution.

3. Process according to claim 1 wherein the hydrogenating is carried out in two stages at elevated temperatures and pressures in the presence of a hydrogenation catalyst, the aromatic hydrocarbon being a dialkyl substituted phenyl compound, and the dihydroperoxide being the dihydroperoxide of said dialkyl-substituted phenyl compound, the organic solvent treatment of the aqueous alkali phase and the subsequent aqueous alkali treatment of the organic solvent phase being carried out at a temperature of from about 0 to 80° C.

4. Process according to claim 1 wherein the organic solvent is benzene.

5. Process according to claim 1 wherein the organic solvent is toluene.

6. Process according to claim 1 wherein the organic solvent is xylene.

7. Process according to claim 1 wherein the organic solvent is m-diisopropyl benzene.

8. In the continuous oxidation of dialkylated aromatic hydrocarbons of the formula

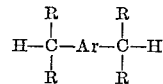

wherein R is alkyl and Ar is an aromatic radical, to produce a reaction mixture containing the corresponding dihydroperoxides, monohydroperoxides and other oxidation reaction products, in which the oxidation reaction mixture is extracted with aqueous alkali to recover therefrom the main content of the corresponding dihydroperoxide in the resulting aqueous alkali phase, said aqueous alkali phase is extracted with an organic solvent substantially immiscible with water to remove the corresponding monohydroperoxide content and other oxidation reaction products, and said dihydroperoxide is recovered in said aqueous alkali phase in high purity, the improvement of treating the organic solvent phase, containing the corresponding monohydroperoxide content and other oxidation reaction products, which remains after extraction with said aqueous alkali phase, wtih further aqueous alkali in a further separate alkali extraction step to extract substantially all the remaining corresponding dihydroperoxide from the organic solvent phase prior to hydrogenation of said organic solvent phase, thereafter passing said organic solvent phase to a hydrogenation zone and hydrogenating the monohydroperoxide content and other oxidation reaction products from said organic solvent and recycling the hydrogenation products obtained back to the oxidation, said organic solvent being selected from the group consisting of ketones, halogenated hydrocarbons, ethers, alcohols, unsubstituted aromatic hydrocarbons, mono-alkylated aromatic hydrocarbons, and dialkylated aromatic hydrocarbons.

References Cited by the Examiner

UNITED STATES PATENTS

| | | | |
|---|---|---|---|
| 2,776,320 | 1/57 | Thompson | 260—610 |
| 2,854,487 | 9/58 | Quin | 260—618 |
| 2,856,433 | 10/58 | Thompson | 260—610 |

LEON ZITVER, *Primary Examiner.*

CHARLES B. PARKER, HAROLD G. MOORE, *Examiners.*